United States Patent [19]

Sako et al.

[11] Patent Number: 5,060,221
[45] Date of Patent: Oct. 22, 1991

[54] DIGITAL DATA RECORDING/REPRODUCTION APPARATUS

[75] Inventors: Yoichiro Sako, Chiba; Hiroshi Ogawa, Kanagawa, both of Japan

[73] Assignee: Sony Corporation, Tokyo, Japan

[21] Appl. No.: 351,837

[22] Filed: May 12, 1989

[30] Foreign Application Priority Data

May 16, 1988 [JP] Japan .............................. 63-118567

[51] Int. Cl.$^5$ ..................... G11B 20/12; G06F 11/10
[52] U.S. Cl. ..................... 369/59; 371/37.4; 371/43
[58] Field of Search ............ 369/32, 59, 48-50; 371/43-45, 2.1, 37.4, 40.1, 40.2

[56] References Cited

U.S. PATENT DOCUMENTS

| | | | |
|---|---|---|---|
| 4,413,340 | 11/1983 | Odaka et al. | |
| 4,512,006 | 4/1985 | Murakami et al. | 369/59 |
| 4,729,043 | 3/1988 | Worth | 369/59 |
| 4,747,104 | 5/1988 | Piret | 371/38.1 |
| 4,791,622 | 12/1988 | Clay et al. | 369/54 |

Primary Examiner—Aristotelis M. Psitos
Assistant Examiner—Won Tae Christopher Kim
Attorney, Agent, or Firm—Philip M. Shaw, Jr.

[57] ABSTRACT

An apparatus for use with a compact disc for writing and reproducing data into an arbitrary sector or rewriting data of an arbitrary sector by allowing the selection of an interleave process similar to that in a music type compact disc or an interleave process of a length corresponding to one recording unit (sector) to thereby make possible sector-completion type encoding and decoding.

9 Claims, 16 Drawing Sheets

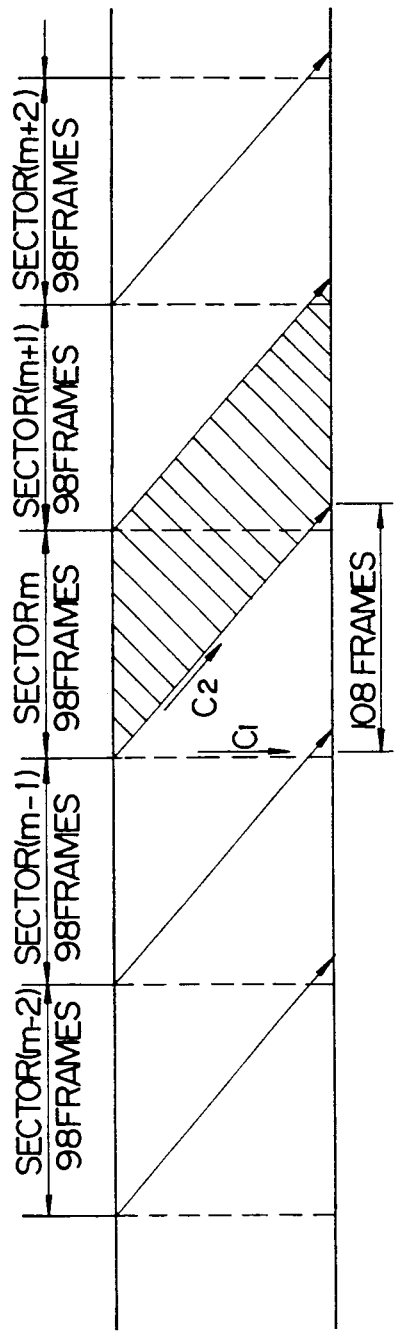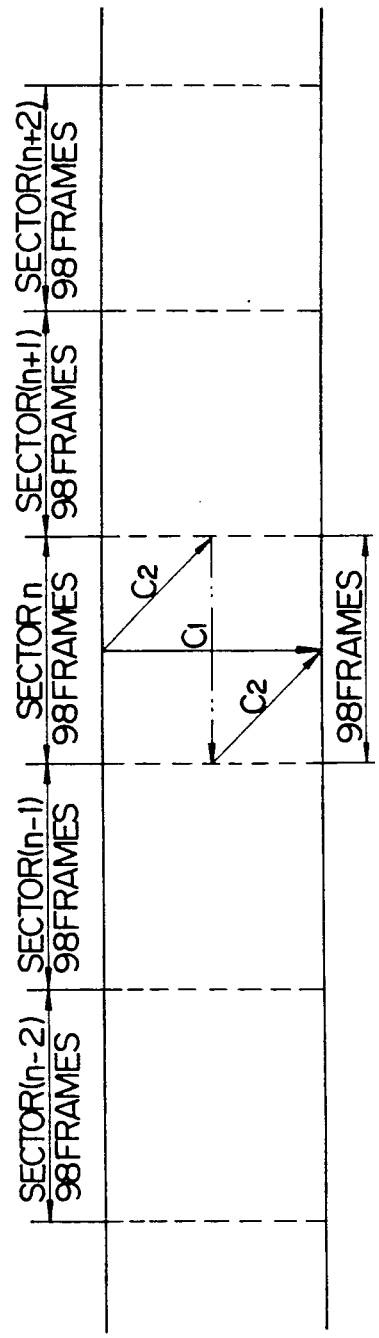

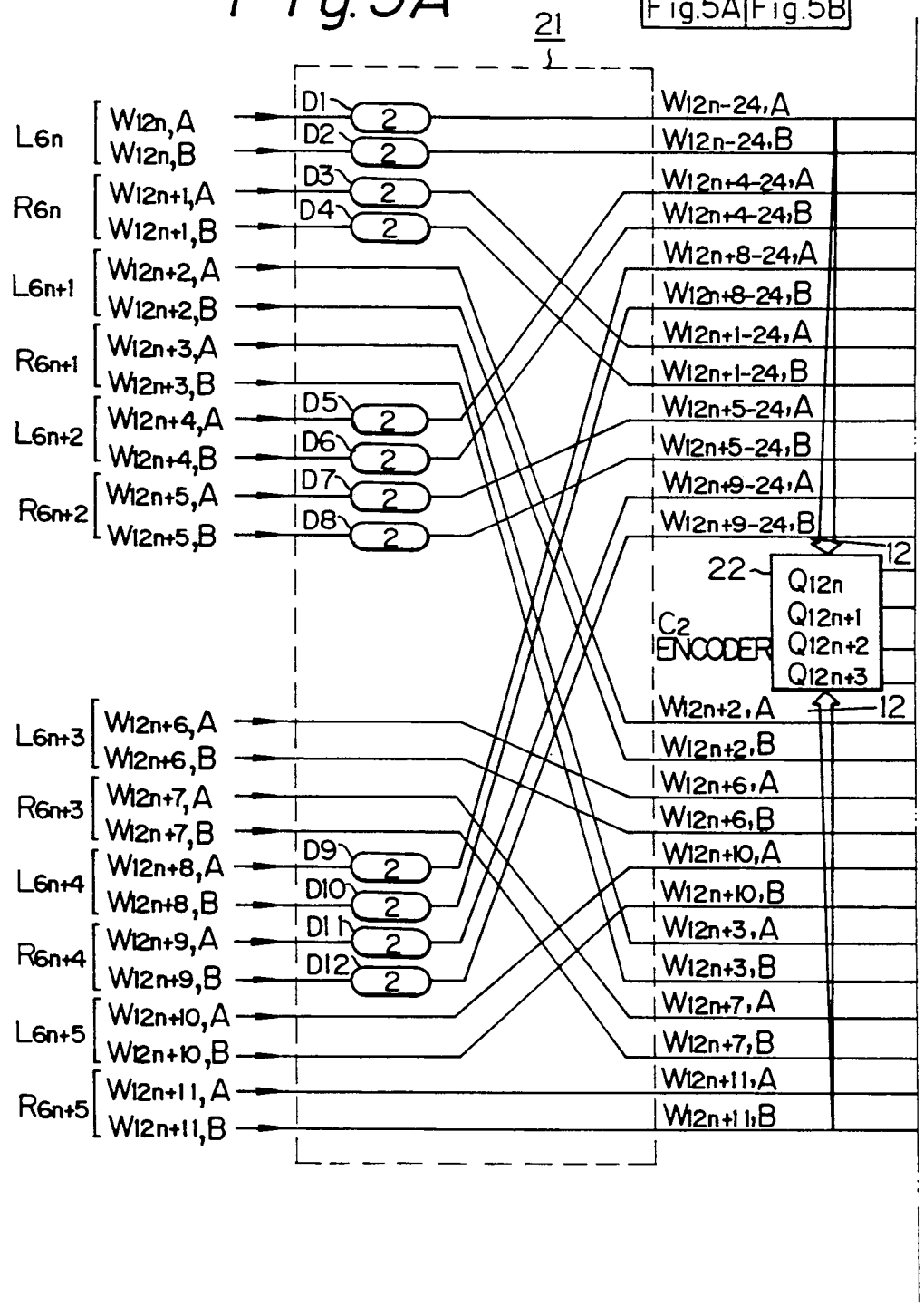

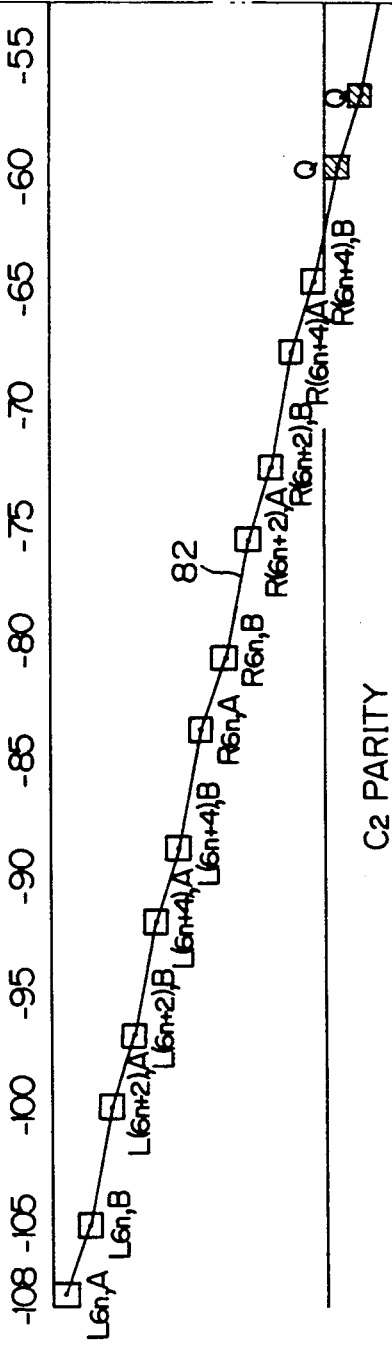

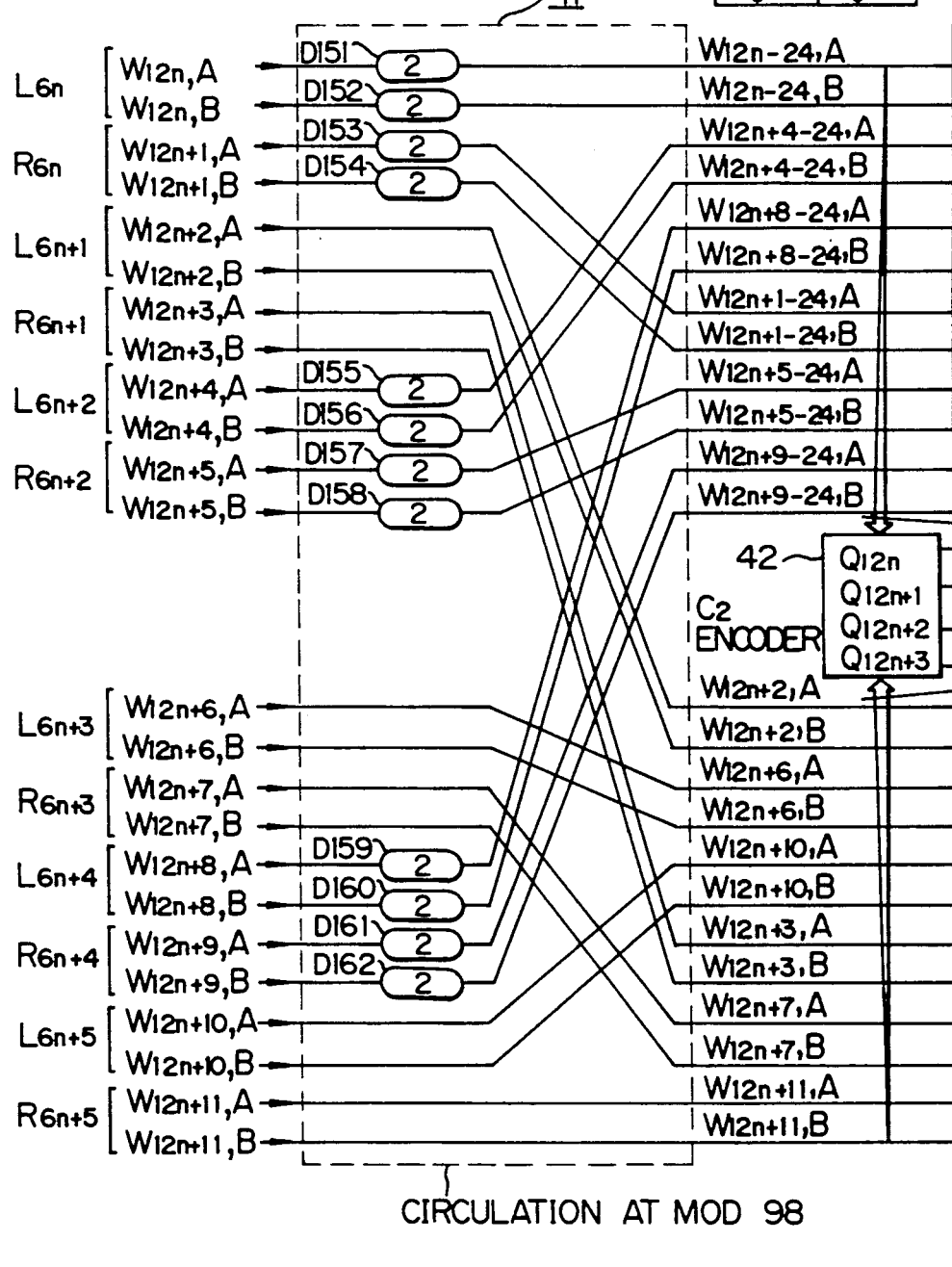

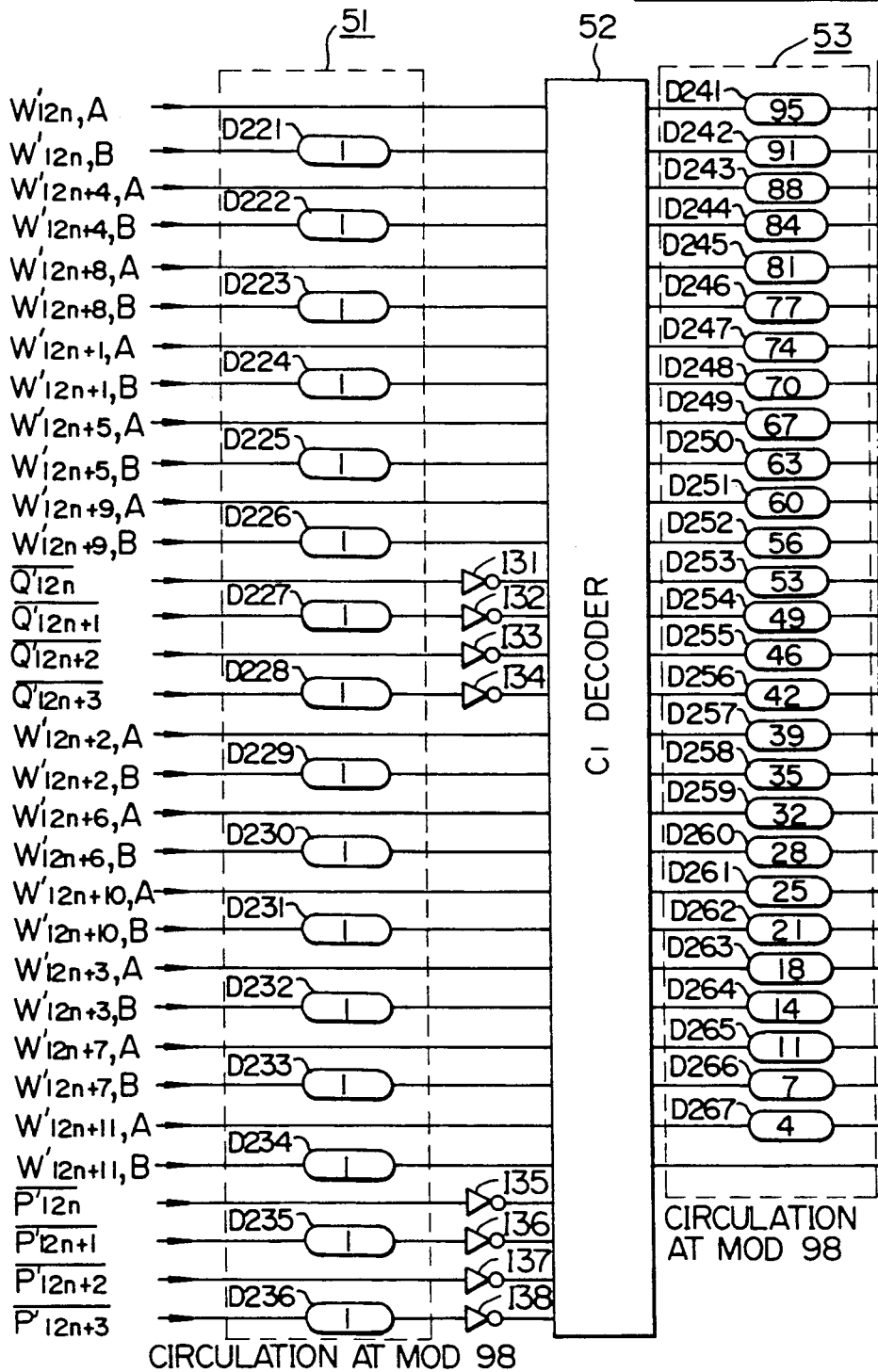

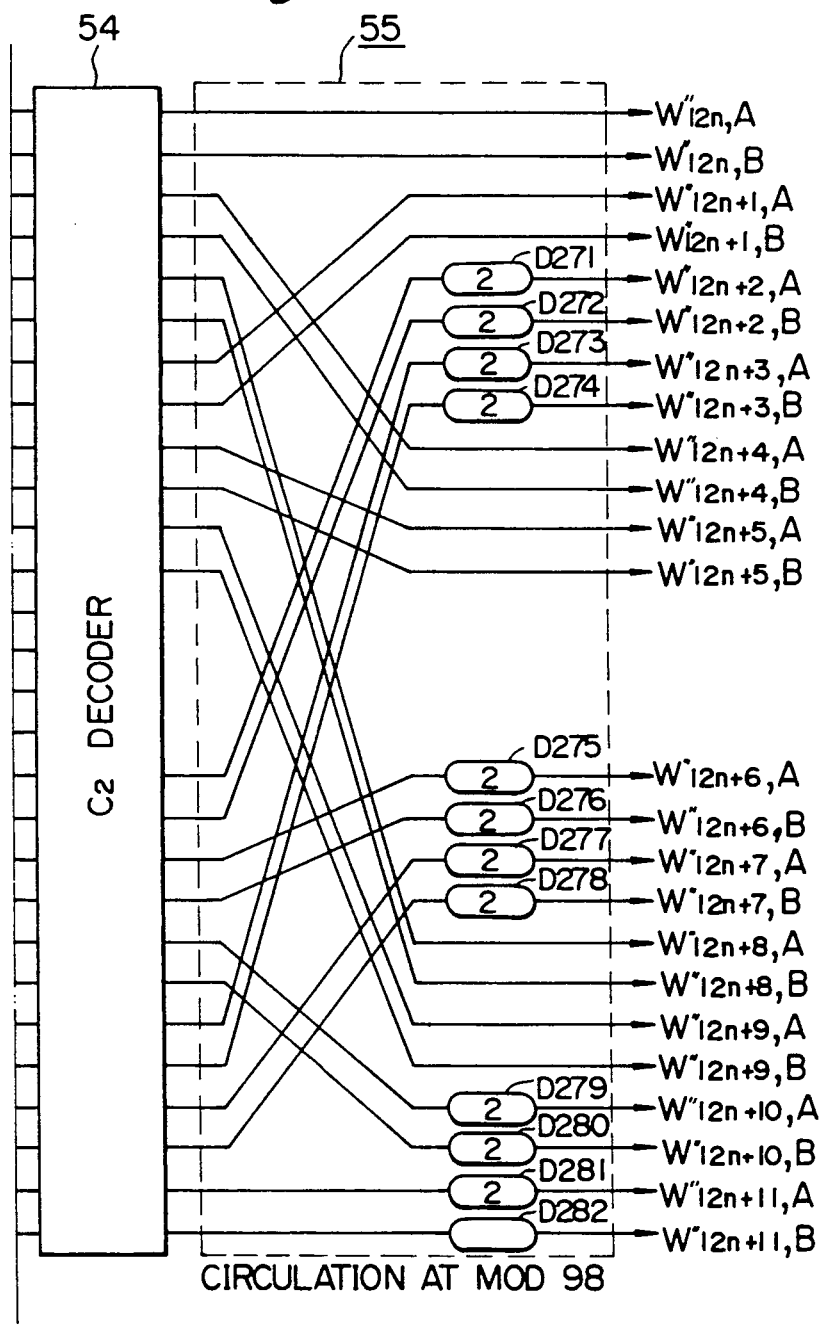

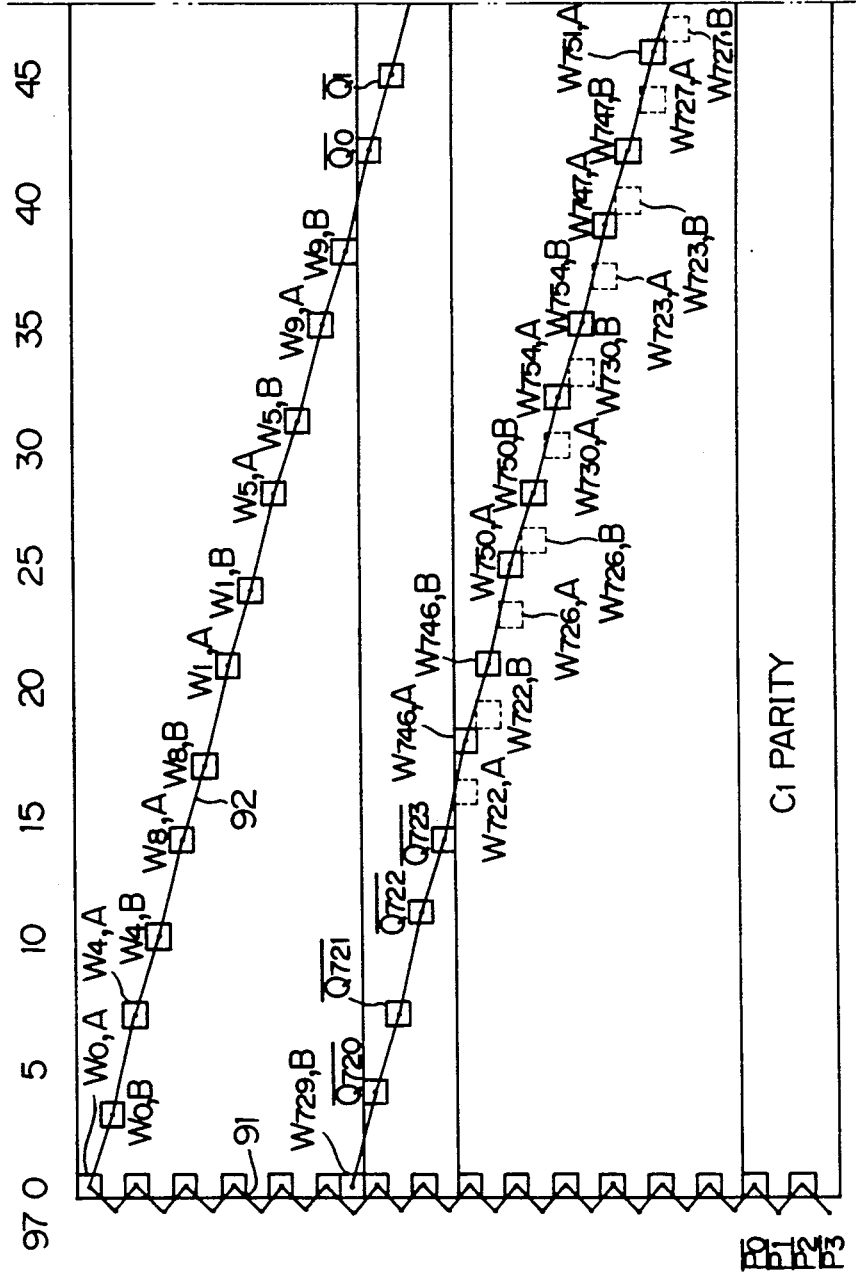

DIGITAL DATA RECORDING/REPRODUCTION APPARATUS

BACKGROUND OF THE INVENTION

1. Field of the Invention

The invention relates to a digital data recording/reproduction apparatus and, more particularly, to a digital data recording/reproduction apparatus for recording/reproducing data onto and from an optical recording medium in the form corresponding to a compact disc for music, for example.

2. Description of the Prior Art

A compact disc in which an audio signal is digitized and optically recorded is well known. The compact disc is a recording medium having a diameter of 12 cm and capable of recording data equal to or greater than about 500 megabytes, for example. As a result, this compact disc can be employed as a digital-data recording medium for recording a large amount of data.

A CD-ROM has been standardized in which digital data other than audio data can be recorded in the music recording area. In the CD-ROM, digital data is recorded in the same manner as the music compact disc. An optical disc with a diameter of 12 cm is employed on which tracks are formed in a spiral fashion, similarly to the music compact disc. The recording data is doubly encoded with CIRC (Cross Interleave Reed-Solomon Code), EFM modulated (8–14 modulation) and optically recorded on the optical disc.

In such a CD-ROM, one sector (one block) that is a unit for data recording is composed of one subcode block of 98 frames. In other words, in the music compact disc, an 8-bit subcode of P~W per frame (R~W are also called "users' bits") is prepared. Since the subcode provides one information unit (address) with 98 frames, the 98 frames are called a "block."

Basically, the CD-ROM is a recording medium for read-out only. The CD-ROM has a large memory capacity, enables a large amount of copies and provides information with less deterioration. Utilizing such features, the CD-ROM is used for the recording of data of various kinds of dictionaries or data of research materials.

In recent years, an additional recording type optical recording medium, i.e. an optical magnetic disc, for enabling erasure and rerecording has been developed. It has been proposed to use such an optical magnetic disc to record and reproduce digital data. Additional data can be recorded or rerecorded on such a compact disc (hereunder called "CD-WO" for compact disc, write once) or the data can be erased and rerecorded (hereunder called a "CD-erasable"). Thus its extensive application in various fields can be expected as compared with a CD-ROM which allows reproduction only.

In the CD-WO or CD-erasable, it is useful if the writing/rewriting of data can be done in a unit of one sector. In contrast, the music compact disc is for reproduction only and data is reproduced in the order of a time sequence.

In the music compact disc, the data is sequential and an interleave of a maximum of 108 frames is used for the recording data. For this reason, when the CD-WO or CD-erasable is used in the same signal processing manner as the music compact disc, complicated signal processing is needed in the case where the data is to be written into an arbitrary sector or where data of an arbitrary sector is rewritten. If the signal format of the CD-WO or CD-erasable is altered to be quite different from that of the music compact disc so as not to need such complicated processing, the compatibility between the CD-ROM, CD-WO and CD-erasable is lost.

In the compact disc, a CIRC is employed in which an interleave delay is made for symbols of each column on a two-dimensional data array including a developed and added parity of the $C_2$ sequence using the Reed-Solomon code and in which a parity of the $C_1$ sequence is developed and added using the Reed-Solomon code. In such a CIRC, an interleave of a maximum of 108 frames is applied and convolution encoding is made so that an optimization for sequential data such as music data can be achieved. On the other hand, one sector is composed of a subcode block of 98 frames, which is a unit for data writing and read-out in a CD-WO or CD-erasable.

Consequently, when the rewriting of data of an arbitrary sector is done, its influence extends to two sectors before the sector and two sectors after the sector. Namely, if the data of the arbitrary sector is rewritten, the parity of the $C_1$ sequence relating to data of the two sectors before the sector and data of the two sectors after the sector tends to vary.

For this reason, in the case of the rewriting of data into an arbitrary sector, there is a need to take in data of that sector and two sectors lying after and before the sector respectively and to correct the data after obtaining the parity of the $C_1$ sequence.

Therefore, as proposed in the specification of U.S. patent application Ser. No. 250,515, filed Sept. 29, 1988, for instance, at least two continuous sectors with all [0] data are inserted between sectors for data recording, and it is proposed that only every third sector is used as a sector for data recording, for example. While with this scheme there is no need to obtain the parity of the adjacent sectors, the data recording capacity is eventually deteriorated to about ⅓ at worst.

OBJECTS AND SUMMARY OF THE INVENTION

An object of this invention is, therefore, to provide a digital data recording/reproduction apparatus which does not need complicated processing in the recording of data into an arbitrary sector or in the rewriting of data of an arbitrary sector and does not cause a decrease of the data recording capacity.

Also, since a convolution code is conventionally employed in this way, when data of an arbitrary sector is taken in, data of at least two sectors continuous to the arbitrary sector must be taken in, requiring an unduly long access time. Therefore it is another object of the invention to provide a digital data recording/reproduction apparatus with a reduced access time compared to conventional devices.

In accordance with an aspect of this invention, in a digital data recording apparatus of the type having encoding means for adding a predetermined error correction code to input data and means for recording said encoded data onto a recording medium, the improvement according to the invention is that the encoding means includes a memory for temporarily storing the input data and address control means for controlling an address for the memory. The address control means is capable of setting a first address control and a second address control.

A selection signal for selecting the manner of recording the data by the first address control and data recorded by the second address control is recorded onto the recording medium.

Also, in accordance with another aspect of this invention, in a digital data reproduction apparatus of the type having means for reproducing data recorded on a recording medium and decoding means for decoding said reproduced data, the decoding means according to the invention includes a memory for temporarily storing the reproduced data and address control means for controlling an address for the memory. The address control means is capable of selecting an address of the recording medium control depending on whether the reproduction data is the data recorded by the first address control or the data recorded by the second address control.

A decision is made on whether the reproduction data of the recording medium is the data recorded by the first address control or the data recorded by the second address control by reproducing the selection signal recorded on the recording medium.

Recording/reproducing of digital data is carried out using an optical disc with a configuration identical to a compact disc. At this time, first and second interleave processes can be set. In the first interleave process, the entire interleave length is made equal to 108 frames. The first interleave process is suited for the case where sequential data such as music data is handled and also the case where a complete compatibility with a music compact disc or a CD-ROM should be established.

In the second interleave process, the entire interleave length is made equal to 95 frames, and an interleave is applied by the processing of a modulo 98 while circulating in 98 frames. With this system, error correction encoding is completed within one sector consisting of 98 frames. The second interleave process is suited for the case where there is a great need for writing data into an arbitrary sector or for rewriting data of an arbitrary sector, since the error correction encoding is completed within one sector.

The above and other objects, features and advantages of the present invention will be apparent from the following detailed description in conjunction with the accompanying drawings.

BRIEF DESCRIPTION OF THE DRAWINGS

FIGS. 3 and 4 are schematic diagrams for describing one embodiment of the invention.

FIGS. 5A, 5B, 6A and 6B are block diagrams for describing a first interleave process.

FIGS. 7A, 7B and 8 are schematic diagrams for describing the first interleave process.

FIGS. 9A, 9B, 10A and 10B are block diagrams for describing a second interleave process.

FIGS. 11A, 11B and 12 are schematic diagrams for describing the second interleave process.

DESCRIPTION OF THE PREFERRED EMBODIMENT

An embodiment of this invention will be described in the following order:
a. Outline of a recording/reproduction apparatus,
b. Frame structure and sector structure,
c. With respect to interleave processes,
d. Encoding process and decoding process in the case of a first interleave process,
e. Encoding process and decoding process in the case of a second interleave process, and
f. Encoding/decoding process in one embodiment.

a. Outline of a recording/reproduction apparatus

Figure 1:
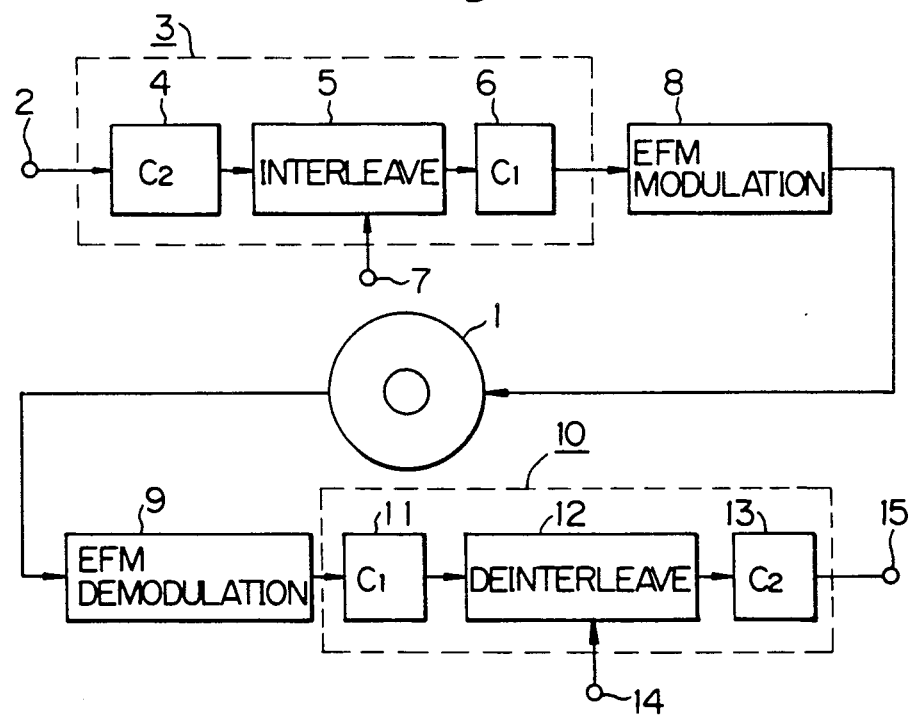
FIG. 1 is a block diagram showing an entire construction of one embodiment of this invention.

FIG. 1 shows a block diagram of a recording/reproduction apparatus to which this invention is applied. In FIG. 1, 1 is an optical disc on which digital data is optically recorded/reproduced. Instead of the optical disc 1, an additional recording type optical disc or an optical disc in which erasure and recording are possible, for example, an optical magnetic disc can be used. The optical disc 1 has a similar form to that of the music compact disc. More clearly, the diameter of the optical disc 1 is 12 cm, and tracks of a spiral shape are formed in the optical disc 1. The optical disc 1 is rotated with CLV (constant line velocity).

At the time of recording, data to be recorded on the optical disc 1 is supplied to a data input terminal 2. The recording data is given to an encoding circuit 3. The encoding circuit 3 is composed of a $C_2$ encoder 4, an interleave delay circuit 5, and a $C_1$ encoder 6. Data from the input terminal 2 is developed in a predetermined frame construction and doubly encoded for a $C_1$ sequence and a $C_2$ sequence at the encoder 3. A selection signal is given from a terminal 7 to the interleave delay circuit 5. As mentioned later, a first interleave process and a second interleave process which are different in interleave length are applied at the interleave delay circuit 5. In the case of the first interleave process, an interleave of a maximum of 108 frames is applied. Further, in the case of the first interleave process, convolution encoding is made. In the case of the second interleave process, the length of its interleave becomes 98, and in the second interleave process, error correction encoding is completed in one sector.

Data with error correction codes doubly added at the encoding circuit 3 is subjected to EFM modulation (8-14 modulation) at an EFM modulator 8 and recorded onto the optical disc 1.

In the reproduction of data recorded on the optical disc 1, the above processes are done in the reverse sequence. The reproduced data of the optical disc 1 is supplied to an EFM demodulator 9 and EFM demodulated. The output of the EFM demodulator 9 is fed to a decoding circuit 10. The decoding circuit 10 is made up of a $C_1$ decoder 11, a deinterleave delay circuit 12, and a $C_2$ decoder 13. The deinterleave delay circuit 12 can perform a first and a second deinterleave process corresponding to the two interleave processes that can be selected at the interleave delay circuit 5. A selection signal is supplied to the deinterleave delay circuit 12 from a terminal 14. The selection signal enables the switching between the two deinterleave processes.

At the time of recording, data representing which of the first and second interleave processes has been done can be written into a part of the optical disc 1, for example, in a TOC (Table of Contents) of the innermost circumference of the disc, and at the time of reproduction, the deinterleave delay circuit 12 can be switched depending on the data.

In addition, it is possible to record a signal of the first interleave process and a signal of the second interleave process in their mixed way. More specifically, with the provision of a data area in which predetermined data is recorded and a user's area in which a user can write freely in the optical disc 1, for example, a signal can be recorded in the area for recording the predetermined data in the first interleave process and a signal can be recorded in the user's area in the second interleave process. In this case, the data area enables a great amount of copies to be made using a stamper as in the CD-ROM.

The output of the decoding circuit 10 is taken out of an output terminal 15, and reproduced data is provided from the output of the output terminal 15.

b. Frame structure and sector structure

Figure 2A:
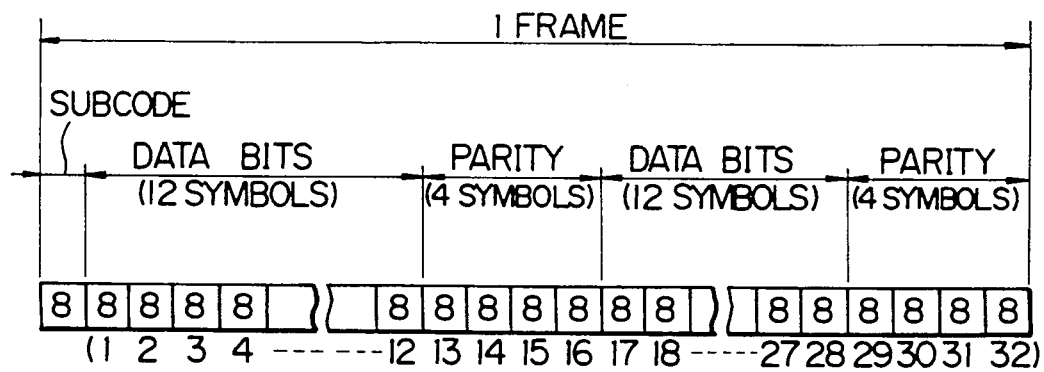
FIGS. 2A and 2B are schematic diagrams for describing a recording format of one embodiment of the invention.

In the optical disc 1, data is developed into a frame structure and recorded with EFM modulation as shown in FIG. 2A. The frame structure is the same as the music compact disc. More specifically, as shown in FIG. 2A, one frame comprises data bits of 24 symbols corresponding to each six samples of L (left) and R (right) in the case of 16-bit sampling for audio data (one symbol is eight bits, EFM-modulated 14-channel bits), an 8-symbol parity, one symbol subcode, a 24-channel-bit frame sync (not shown), and margin bits (not shown) for suppressing a direct current component.

Consequently, the total channel bit numbers of one frame is:

| | |
|---|---|
| Frame sync | 24-channel bits |
| Data bits | 14 × 24 = 336-channel bits |
| Subcode | 14-channel bits |
| Parity | 14 × 8 = 112-channel bits |
| Margin bits | 3 × 34 = 102-channel bits |
| Total | 588-channel bits |

Figure 2B:
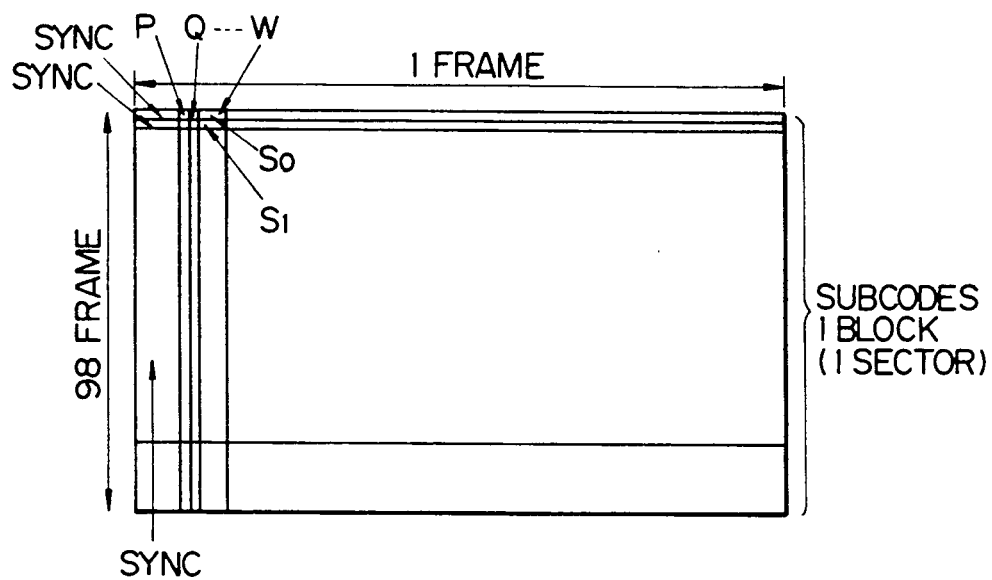

One-symbol subcodes of each frame are present for eight channels ranging from P to W. As shown in FIG. 2B, 1 subcode block is composed of 98 subcodes assembled from the eight channels of P to W of each frame. The subcode block is called "one sector". As a result, one sector corresponds to 98 frames. Two patterns which are not present in 256 patterns at the time of EFM modulation of data are selected as subcode frame sync $S_0$, $S_1$.

The P channel among these subcodes of P~W is used as a flag indicative of a head. The Q channel is used as a control bit. A data/audio flag, an address, a track number, a time code, etc. are recorded in the Q channel.

c. With respect to the interleave processes

As has been described above, in one embodiment of the invention, data is recorded with the addition of double error correction codes for the $C_1$ sequence and the $C_2$ sequence. In such encoding, either a first or a second interleave processes can be selected.

In the first interleave process, an interleave of a maximum of 108 frames is applied. In this case, convolution encoding is made together with continuous frames. This first interleave process is a process similar to that of a music compact disc or a CD-ROM. Therefore, such a process is suitable for handling sequential data such as music data and for maintaining full compatibility with a music compact disc or CD-ROM.

In the second interleave process, an interleave of a maximum of 95 frames is applied. The interleave is applied by the processing of a modulo 98 while circulating in 98 frames. With this process, error correction encoding is accomplished in one sector consisting of 98 frames. The second interleave process is suited for use in the case where there is a great need for the writing of data in an arbitrary sector or for the rewriting of data of an arbitrary sector, since the error correction encoding is finished in one sector.

It is to be noted that the basic encoding process and decoding process are similar in the first interleave process and the second interleave process. Specifically, data is arranged in a two-dimensional fashion, the parity Q is added by the (28, 24, 5) Reed-Solomon code, and the encoding of the $C_2$ sequence is done. Further, an interleave is applied, the parity P is added by the (32, 28, 5) Reed-Solomon code, and the encoding of the $C_2$ sequence is made.

In the case of the first interleave process, an interleave of a maximum of 108 frames is applied and the convolution encoding is made. For this reason, when the data recording is performed in an arbitrary sector or when the rewriting of data in an arbitrary sector is done, processing becomes complicated.

That is, when the first interleave process is carried out, the interleave of a maximum of 108 frames is executed and the convolution encoding is done together with data of the continuous frames as indicated in the conceptional diagram of FIG. 3. In FIG. 3, data of a sector m is disposed, as indicated by the oblique shading lines in FIG. 3, by the interleave of a maximum of 108 frames, for example. When the data of the sector m in the area indicated by the oblique lines is rewritten, this affects all the $C_1$ sequence of the next following sector $(m+1)$ and the $C_1$ sequence of a part of the second following sector $(m+2)$ and further affects all the $C_1$ sequence of the preceding sector $(m-1)$ and the $C_1$ sequence of a part of a sector $(m-2)$. Consequently, when the data of the sector m is rewritten, the parities of the $C_1$ sequences of the sectors $(m+1)$, $(m+2)$, $(m-1)$, and $(m-2)$ must be corrected correspondingly.

Figure 5B:
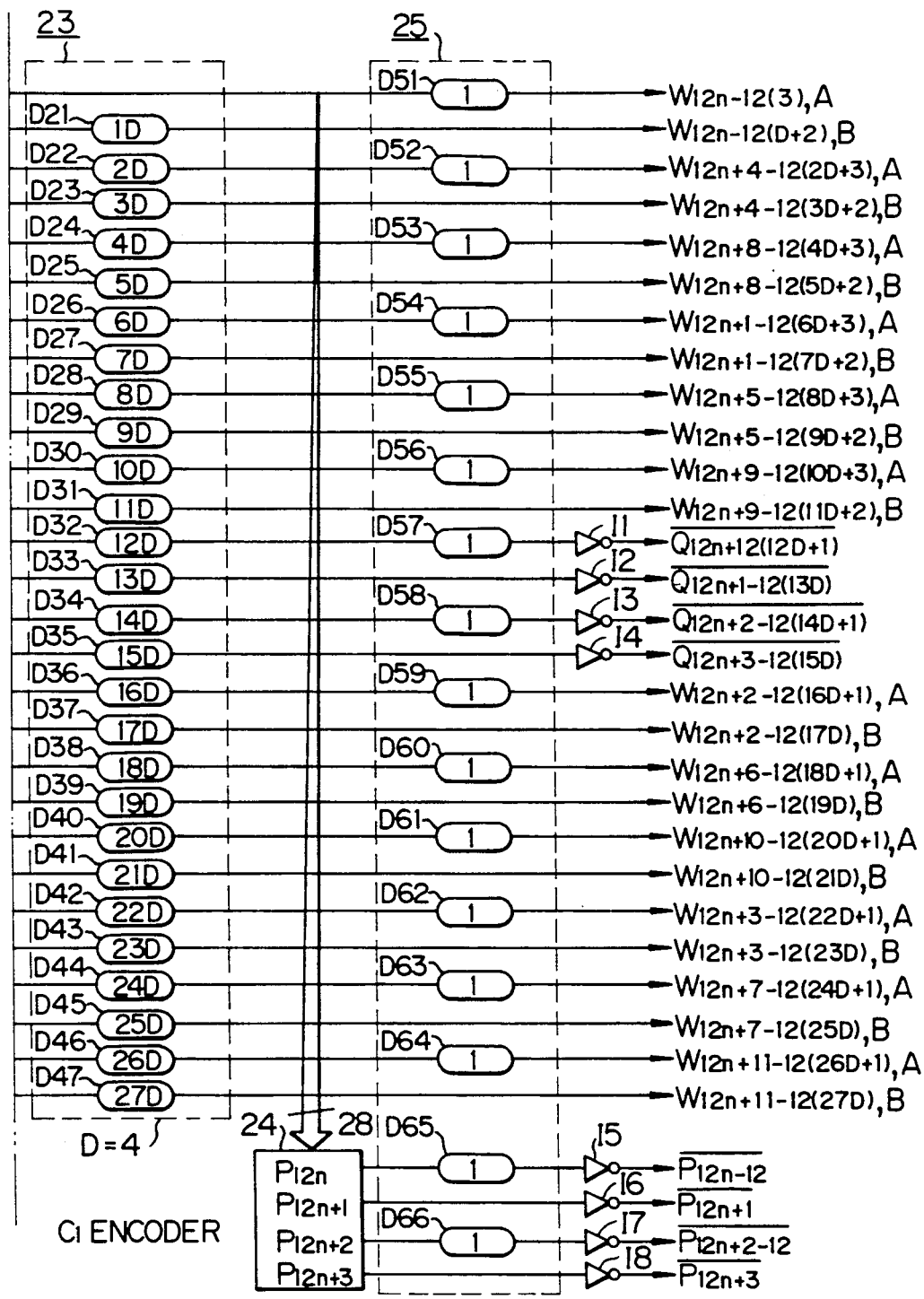

On the other hand, in the second interleave process, the length of an interleave is selected to be 95 frames less than the frame number of one sector, and the interleave is applied while circulating with a modulo 98. As a result, as shown in the conceptional diagram of FIG. 4, error correction encoding is completed in one sector. Therefore, if the rewriting of a sector n is done, for instance, this does not affect sectors $(n+1)$, $(n+2)$, $(n-1)$, or $(n-2)$ at all.

d. Encoding process and decoding process in the case of a first interleave process An encoding process in the case of data encoding in the first interleave process will be explained referring to FIGS. 5A and 5B.

Twelve sixteen-bit data to be recorded, that is, $L_{6n}$, $R_{6n}$, $L_{6n+1}$, $R_{6n+1}$, ..., $L_{6n+5}$, $R_{6n+5}$ are sent to a delay block 21 after being divided into data of upper eight bits and lower eight bits, that is $W_{12n}$,A, $W_{12n}$,B, ..., $W_{12n+11}$,A, $W_{12n+11}$,B. The upper eight bits are indicated at A, while the lower eight bits are indicated at B.

A two-frame delay is given to data of an even number, i.e., $L_{6n}$, $R_{6n}$, $L_{6n+2}$, $R_{6n+2}$, ... by delay elements $D_1 \sim D_{12}$ at the delay block 21. Simultaneously, a rearrangement of the data is performed at the delay block 21.

Twenty-four symbols produced from the delay block 21 are sent to a $C_2$ encoder 22. A four-symbol parity $Q_{12n}, Q_{12n+1}, \ldots, Q_{12n+3}$ is developed by the (28, 24, 5) Reed-Solomon code at the $C_2$ encoder 22.

The four symbol parity $Q_{12n}, Q_{12n+1}, \ldots, Q_{12n+3}$ developed at the $C_2$ decoder 22 is added to the center of the output data of 24 symbols of the delay block 21 to provide 28 symbols.

The 28 symbols are sent to a delay block 23. An interleave of frames of a multiple of 4 is made for each of the 28 symbols by delay elements D21~D47 of the delay block 23.

Twenty-eight symbols produced from the delay block 23 are sent to a $C_1$ encoder 24. A four-symbol parity $P_{12n}, P_{12n+1}, \ldots, P_{12n+3}$ is developed by the (32, 28, 5) Reed-Solomon code at the $C_1$ encoder 24.

The four-symbol parity $P_{12n}, P_{12n+1}, \ldots, P_{12n+3}$ is added to the last of the 28 symbols output from the delay block 23 to provide 32 symbols.

The 32 symbols are sent to a delay block 25. Each of the 32 symbols is delayed by one frame by delay elements D51~D66 of the delay block 25.

The parity symbols are inverted by inverters I1~I4 and I5~I8 to complete the encoding process. The deciding process is carried out in a manner opposite to the above-mentioned encoding process. The decoding process will be described referring to FIG. 6.

The reproduced 32 symbols (four-symbol parity P and four-symbol parity Q are added to 24 data symbols) are sent to a delay block 31. Each symbol is delayed by one frame by delay elements D71~D86 of the delay block 31. The parity symbols are inverted by inverters I11~I18. The 32 symbols are sent to a $C_1$ decoder 32.

Twenty-eight symbols produced from the $C_1$ decoder 32 are sent to a delay block 33. The interleave of frames of a multiple of 4 is released by delay elements D91~D116 of the delay block 33. The output of the delay block 33 is sent to a $C_2$ decoder 34.

Error correction processing is performed at the $C_1$ decoder 32 and the $C_2$ decoder 34. Twenty four symbols produced from the $C_2$ decoder 34 are sent to a delay block 35. The data is returned to the order of a time sequence at the delay block 35. Data of an odd number is delayed by two frames by delay elements D121~D132, and the decoding process is completed.

Figure 7B:
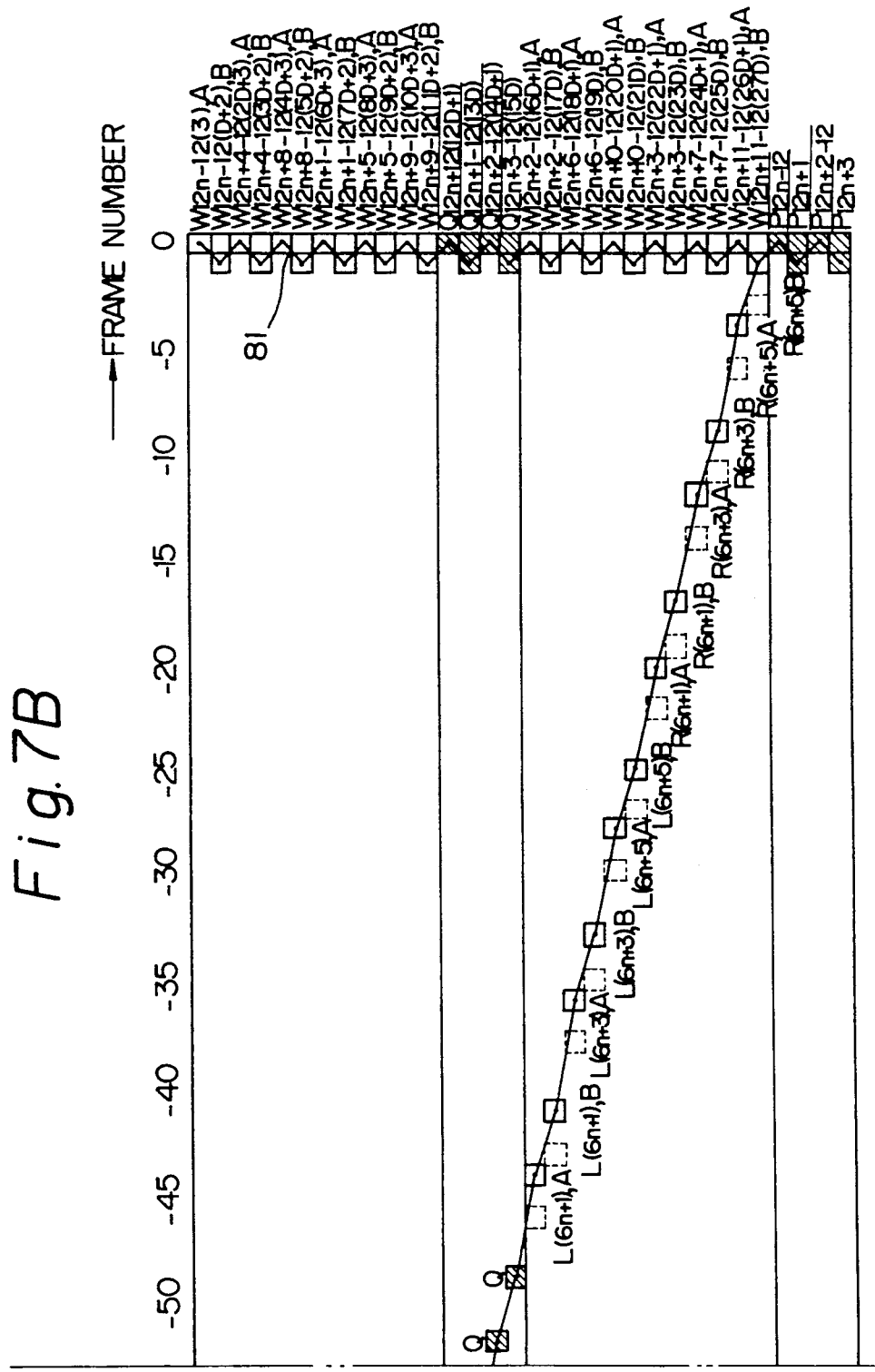
Figure 8:
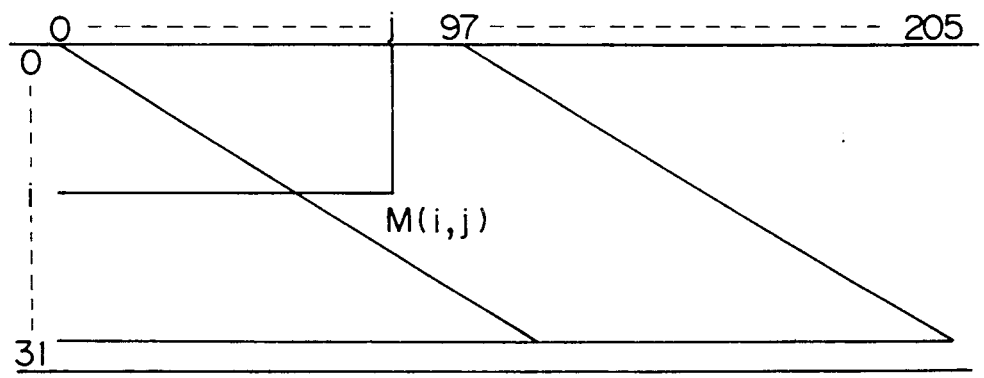

When each symbol in the encoding based on the first interleave process is mapped on the two-dimensional array, it is as shown in FIGS. 7A and 7B. In the case of the first interleave process, the interleave of a maximum of 108 frames is applied. As a result, the coordinates of one sector corresponding to symbols in the time sequence order are indicated in the following table (Table 1). Here, as shown in FIG. 8, $M_{(i, j)}$ indicates a row number i and a column number j at which a symbol is disposed.

TABLE 1

| Symbol | | Coordinates |
|---|---|---|
| $L_{6n}$ | $W_{12n}$, A ---→ | $M_{(0,n)}$ |
| | $W_{12n}$, B ---→ | $M_{(1,n+3)}$ |
| $R_{6n}$ | $W_{12n+1}$, A ---→ | $M_{(6,n+24)}$ |
| | $W_{12n+1}$, B ---→ | $M_{(7,n+27)}$ |
| $L_{6n+1}$ | $W_{12n+2}$, A ---→ | $M_{(16,n+62)}$ |
| | $W_{12n+2}$, B ---→ | $M_{(17,n+65)}$ |
| $R_{6n+1}$ | $W_{12n+3}$, A ---→ | $M_{(22,n+86)}$ |
| | $W_{12n+3}$, B ---→ | $M_{(23,n+89)}$ |

TABLE 1-continued

| Symbol | | Coordinates |
|---|---|---|
| $L_{6n+2}$ | $W_{12n+4}$, A ---→ | $M_{(2,n+8)}$ |
| | $W_{12n+4}$, B ---→ | $M_{(3,n+11)}$ |
| $R_{6n+2}$ | $W_{12n+5}$, A ---→ | $M_{(8,n+32)}$ |
| | $W_{12n+5}$, B ---→ | $M_{(9,n+35)}$ |
| $L_{6n+3}$ | $W_{12n+6}$, A ---→ | $M_{(18,n+70)}$ |
| | $W_{12n+6}$, B ---→ | $M_{(19,n+73)}$ |
| $R_{6n+3}$ | $W_{12n+7}$, A ---→ | $M_{(24,n+94)}$ |
| | $W_{12n+7}$, B ---→ | $M_{(25,n+97)}$ |
| $L_{6n+4}$ | $W_{12n+8}$, A ---→ | $M_{(4,n+16)}$ |
| | $W_{12n+8}$, B ---→ | $M_{(5,n+19)}$ |
| $R_{6n+4}$ | $W_{12n+9}$, A ---→ | $M_{(10,n+40)}$ |
| | $W_{12n+9}$, B ---→ | $M_{(11,n+43)}$ |
| $L_{6n+5}$ | $W_{12n+10}$, A ---→ | $M_{(20,n+78)}$ |
| | $W_{12n+10}$, B ---→ | $M_{(21,n+81)}$ |
| $R_{6n+5}$ | $W_{12n+11}$, A ---→ | $M_{(26,n+102)}$ |
| | $W_{12n+11}$, B ---→ | $M_{(27,n+105)}$ |
| | $Q_{12n}$ ---→ | $M_{(12,n+48)}$ |
| | $Q_{12n+1}$ ---→ | $M_{(13,n+51)}$ |
| | $Q_{12n+2}$ ---→ | $M_{(14,n+56)}$ |
| | $Q_{12n+3}$ ---→ | $M_{(15,n+56)}$ |
| | $P_{12n}$ ---→ | $M_{(28,n)}$ |
| | $P_{12n+1}$ ---→ | $M_{(29,n-1)}$ |
| | $P_{12n+2}$ ---→ | $M_{(30,n)}$ |
| | $P_{12n+3}$ ---→ | $M_{(31,n-1)}$ |

Figure 6A:
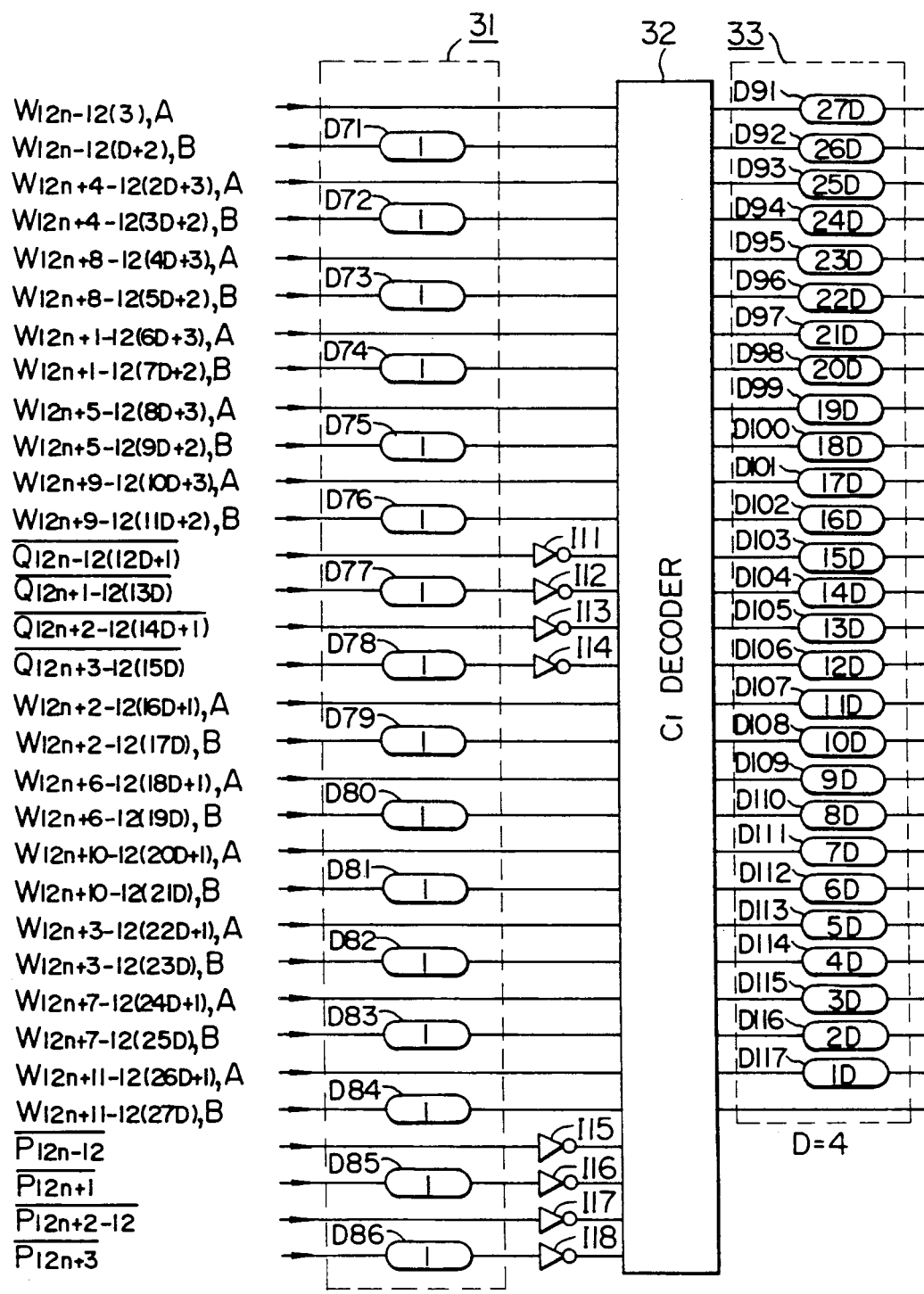
Figure 6B:
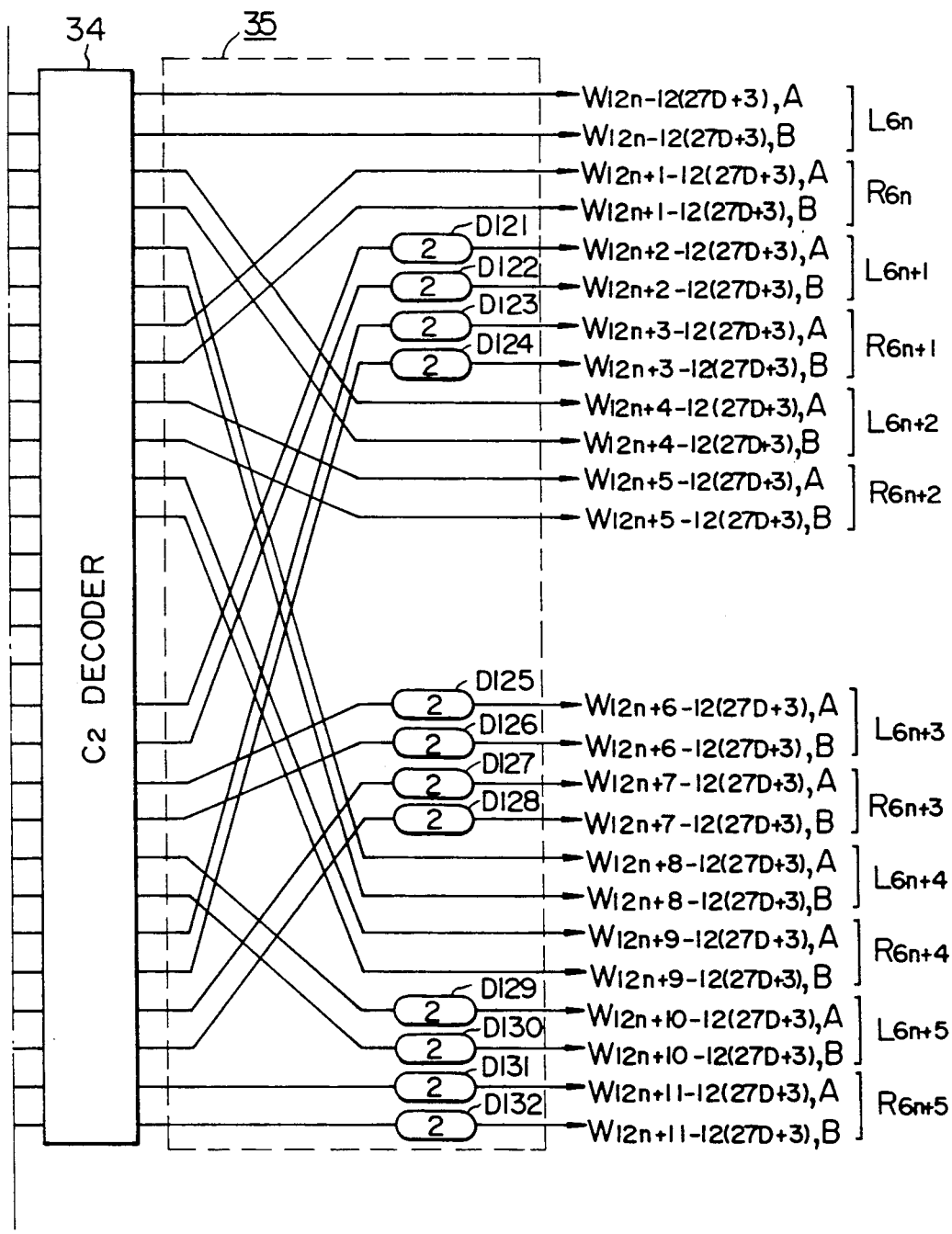

In the case where each symbol is arranged in a two-dimensional fashion as shown in FIGS. 7A and 7B, the interleave is released and data can be decoded by the read-out/write-in in the column direction through the address manipulation corresponding to the decoding process shown in FIGS. 6A and 6B.

Specifically, the decoding of the $C_1$ sequence can be achieved as indicated by a line 81 (FIG. 7B) by delaying symbols in the row of an even number corresponding to the delay block 31 by one frame and reading out data in the column direction.

The decoding of the $C_2$ sequence can be made next as indicated by a line 82 (FIG. 7A) by a delay of $(27 \times 4 = 108)$ frames with respect to the first row, a delay of $(26 \times 4 = 104)$ frames with respect to the second row, a delay of $(25 \times 4 = 100)$ frames with respect to the third row corresponding to the delay block 33 and by read-out.

It is to be noted that since data of an odd number is delayed by two frames corresponding to the delay block 35, the data of an odd number shown at the broken line squares (FIG. 7B) are output at the time of decoding.

e. Encoding and decoding process in the case of a second interleave process

Figure 9B:
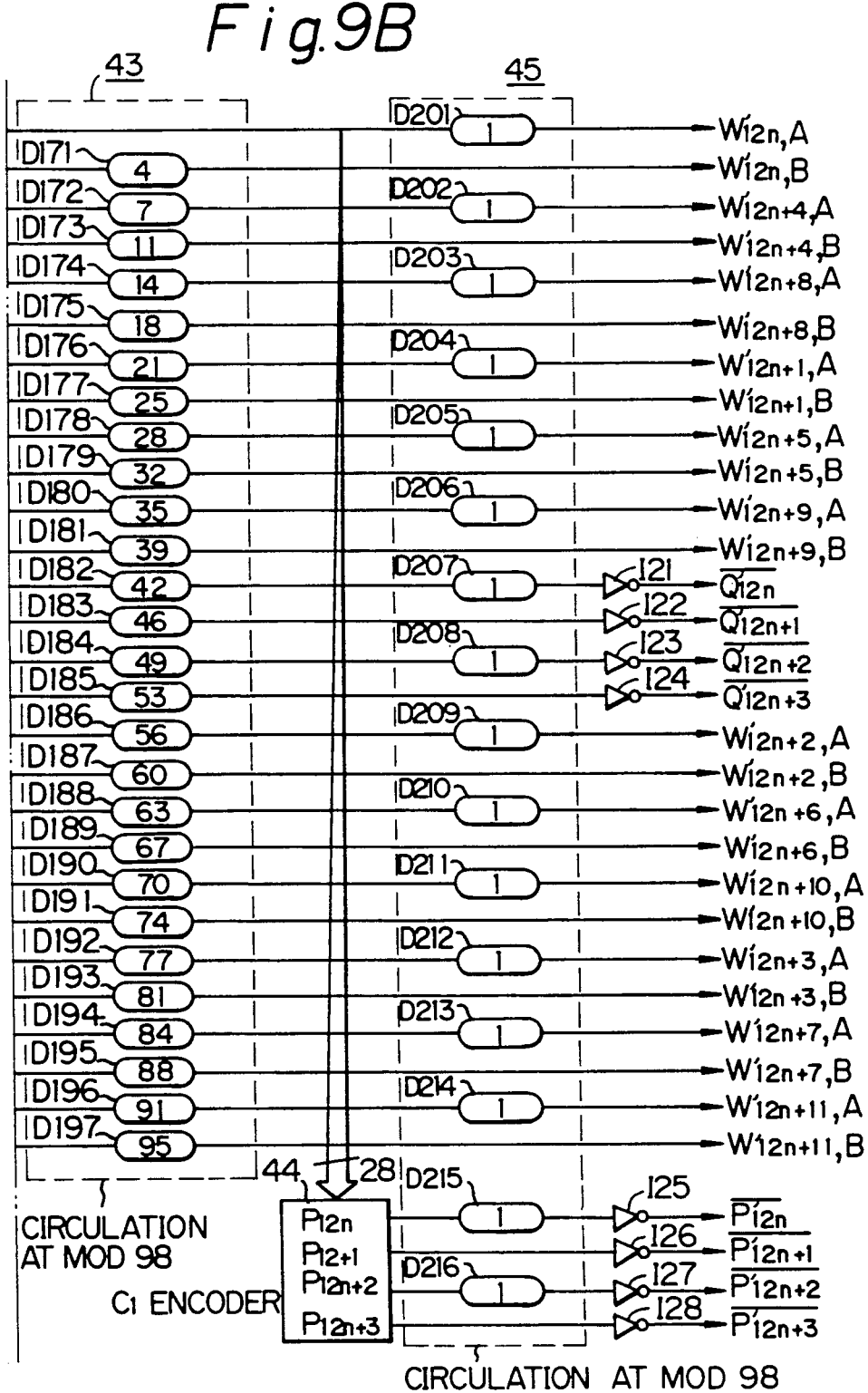

An encoding process in the case of data encoding in the second interleave process will be explained referring to FIG. 9.

Twelve sixteen-bit data $L_{6n}, R_{6n}, L_{6n+1}, R_{6n+1}, \ldots, L_{6n+5}, R_{6n+5}$ are given to a delay block 41 after being divided into data of upper eight bits and lower eight bits, that is, $W_{12n}$,A, $W_{12n}$,B, $\ldots$, $W_{12n+1}$,A, $W_{12n+11}$,B.

A two-frame delay is given to data of an even number, i.e., $L_{6n}, R_{6n}, L_{6n+2}, R_{6n+2}, \ldots$ by delay elements D151~D162 at a delay block 41 (the delay block 41 circulates with a modulo 98). Simultaneously, the rearrangement of data is done at the delay block 41.

Twenty-four symbols output from the delay block 41 are sent to a $C_2$ decoder 42. A four-symbol parity $Q_{12n}$, $Q_{12n+1}, \ldots, Q_{12n+3}$ is developed by the Reed-Solomon code (28, 24, 5) at the $C_2$ decoder 42.

The four-symbol parity $Q_{12n}, Q_{12n+1}, \ldots, Q_{12n+3}$ developed at the $C_2$ decoder 42 is added to the center of the 24-symbol output data of a delay block 42 to provide 28 symbols.

The 28 symbols are sent to a delay block 43. An interleave of four frames, three frames, four frames, three frames, ... is applied by delay elements D171~D197 of the delay block 43 (the delay block 43 circulates with a modulo 98).

Twenty-eight symbols produced from the delay block 43 are sent to a $C_1$ encoder 44. The four-symbol parity $P_{12n}, P_{12n+1}, \ldots, P_{12n+3}$ are developed by the (32, 28. 5) Reed-Solomon code at the $C_1$ encoder 44.

The four-symbol parity $P_{12n}, P_{12n+1}, \ldots, P_{12n+3}$ is added to the last of 28 symbols produced from the delay block 43 to provide 32 symbols.

The 32 symbols are sent to a delay block 45. Each of the 32 symbols is delayed by one frame by delay elements D201~D216 of a delay block 45 (the delay block 45 circulates with a modulo 98).

The parity symbols are inverted by inverters I21-~I24 and I25~I28 to complete the encoding process.

An explanation of the decoding process will be given by referring to FIGS. 10A and 10B. The reproduced 32 symbols are sent to a delay block 51. Every symbol is delayed by one frame by delay elements D221 to D236 of the delay block 51 (the delay block 51 circulates with a modulo 98). The parity symbols reproduced by inverters I31~I38 are inverted. The 32 symbols are given to a $C_1$ decoder 52.

Twenty-eight symbols produced from the $C_1$ decoder 52 are sent to a delay block 53. An interleave of the four frames, three frames, four frames, three frames, ... is released by delay elements D241~D267 of the delay block 53 (the delay block 53 circulates with a modulo 98). The output of the delay block 53 is fed to a $C_2$ decoder 54.

Error correction processing is done at the $C_1$ decoder 52 and the $C_2$ decoder 54. Twenty-four symbols produced from the $C_2$ decoder 54 are sent to a delay block 55. Data is returned to the order of a time sequence at the delay block 55. By delay elements D271~D282, data of an even number is delayed by two frames to finish the decoding process (the delay block circulates with a modulo 98).

Figure 12:
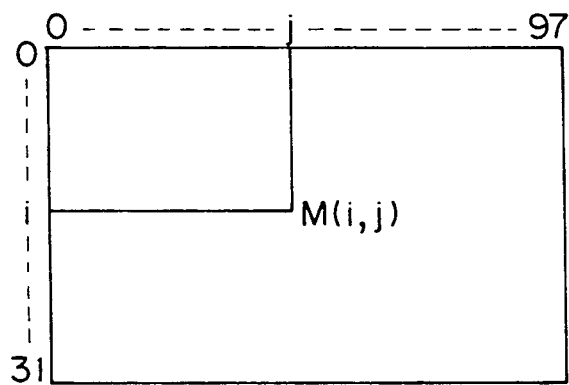
Figure 11B:
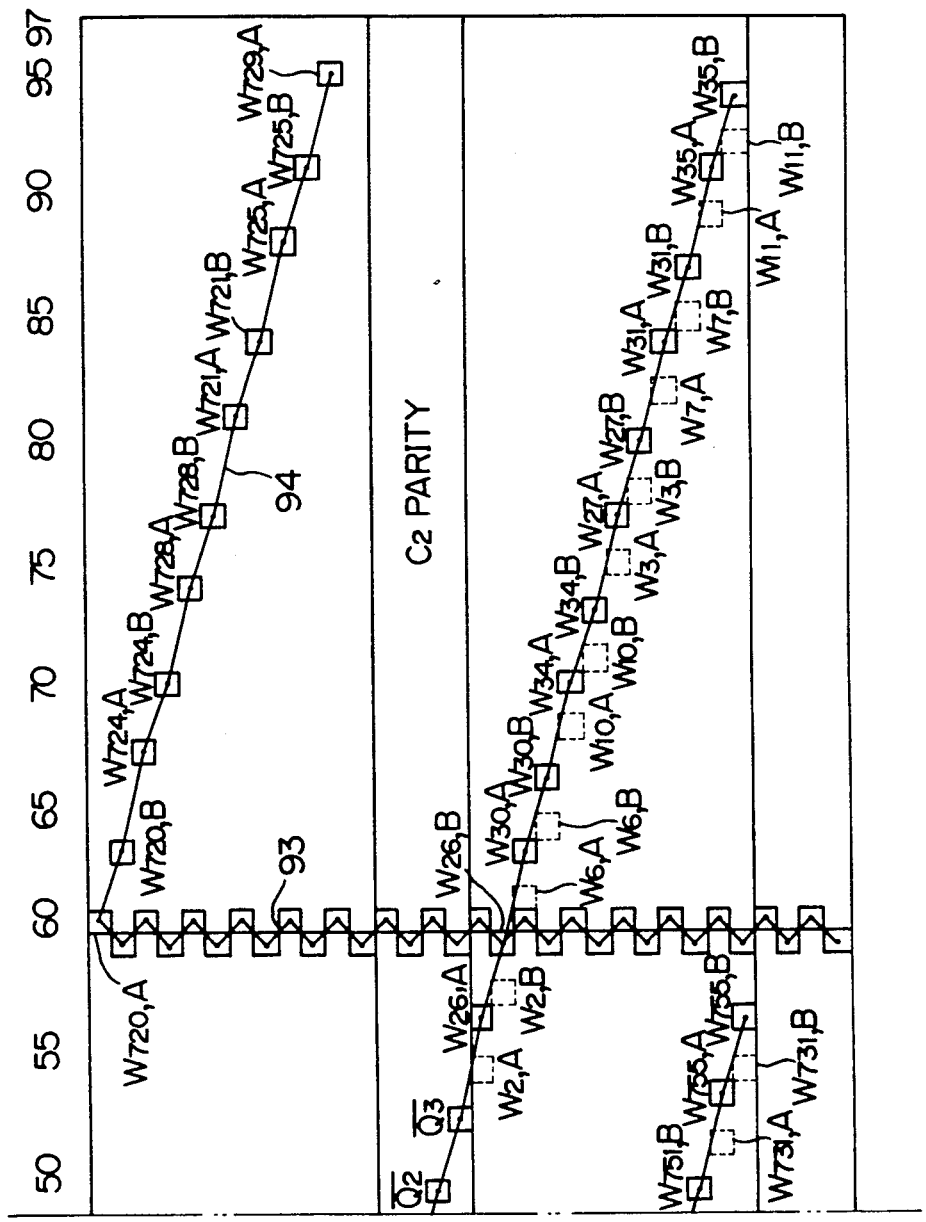

When each symbol in the encoding based on the second interleave process is represented by a map on the two-dimensional array, it is as shown in FIGS. 11A and 11B. In the case of the second interleave process, the interleave of a maximum of 95 frames is applied. By taking a modulo 98, the state returns to the 0 frame after the frame of the 97-th column is delayed. As a result, the coordinates M $(i,j)$ of symbols of one sector corresponding to the symbols $W_{12n},A$, $W_{12n},B$, $W_{12n+1},A$, $W_{12n+1},B$, ... of the time sequence order become as indicated in the following table (Table 2). M (i, j) indicate the coordinates of each symbol as shown in FIG. 12 where i represents a row number, j represents a column number, and n=0~97.

TABLE 2

| Symbol | | | Coordinates |
| --- | --- | --- | --- |
| $L_{6n}$ | { | $W_{12n},$ A | $M_{(0,n)}$ |

TABLE 2-continued

| Symbol | | | Coordinates |
| --- | --- | --- | --- |
| | | $W_{12n},$ B | $M_{(1,n+3)}$ |
| $R_{6n}$ | { | $W_{12n+1},$ A | $M_{(6,n+21)}$ |
| | | $W_{12n+1},$ B | $M_{(7,n+24)}$ |
| $L_{6n+1}$ | { | $W_{12n+2},$ A | $M_{(16,n+54)}$ |
| | | $W_{12n+2},$ B | $M_{(17,n+57)}$ |
| $R_{6n+1}$ | { | $W_{12n+3},$ A | $M_{(23,n+75)}$ |
| | | $W_{12n+3},$ B | $M_{(23,n+78)}$ |
| $L_{6n+2}$ | { | $W_{12n+4},$ A | $M_{(2,n+8)}$ |
| | | $W_{12n+4},$ B | $M_{(3,n+10)}$ |
| $R_{6n+2}$ | { | $W_{12n+5},$ A | $M_{(8,n+28)}$ |
| | | $W_{12n+5},$ B | $M_{(9,n+31)}$ |
| $L_{6n+3}$ | { | $W_{12n+6},$ A | $M_{(18,n+61)}$ |
| | | $W_{12n+6},$ B | $M_{(19,n+64)}$ |
| $R_{6n+3}$ | { | $W_{12n+7},$ A | $M_{(24,n+82)}$ |
| | | $W_{12n+7},$ B | $M_{(25,n+85)}$ |
| $L_{6n+4}$ | { | $W_{12n+8},$ A | $M_{(4,n+14)}$ |
| | | $W_{12n+8},$ B | $M_{(5,n+17)}$ |
| $R_{6n+4}$ | { | $W_{12n+9},$ A | $M_{(10,n+35)}$ |
| | | $W_{12n+9},$ B | $M_{(11,n+38)}$ |
| $L_{6n+5}$ | { | $W_{12n+10},$ A | $M_{(20,n+68)}$ |
| | | $W_{12n+10},$ B | $M_{(21,n+71)}$ |
| $R_{6n+5}$ | { | $W_{12n+11},$ A | $M_{(26,n+89)}$ |
| | | $W_{12n+11},$ B | $M_{(27,n+92)}$ |
| | | $Q_{12n}$ | $M_{(12,n+42)}$ |
| | | $Q_{12h+1}$ | $M_{(13,n+45)}$ |
| | | $Q_{12h+2}$ | $M_{(14,n+49)}$ |
| | | $Q_{12n+3}$ | $M_{(15,n+52)}$ |
| | | $P_{12n}$ | $M_{(28,n)}$ |
| | | $P_{12n+1}$ | $M_{(29,n+97)}$ |
| | | $P_{12n+2}$ | $M_{(30,n)}$ |
| | | $P_{12n+3}$ | $M_{(31,n+97)}$ |

In the case where each symbol is arranged in a two-dimensional fashion as shown in FIGS. 11A and 11B, the interleave is released and data can be decoded by the read-out/write-in in the column direction through the address manipulation corresponding to the decoding process shown in FIGS. 10A and 10B.

Specifically, the decoding of the $C_1$ sequence can be achieved by delaying symbols in the row of an even number corresponding to the delay block 51 by one frame and reading out data in the column direction. In this case, a modulo 98 is taken.

Then, the decoding of the $C_2$ sequence can be done by a delay of 95 frames with respect to the first row, a delay of 91 frames with respect to the second row, a delay of 88 frames with respect to the third row, ... corresponding to the delay block 53 and by read-out. At this time, a modulo 98 is taken.

In FIGS. 11A and 11B, the decoding process at the time of n=0 and that at the time of n=60 are shown. In the case of n=0, the $C_1$ sequence is decoded as indicated at a line 91. In this case, a modulo 98 is taken, and, as a result, the $C_1$ sequence is decoded based on symbols of the frame in the 0-th column and the frame in the 97-th column. Also, in the case of n=0, the $C_2$ sequence is decoded as indicated by a line 92 (FIG. 11A).

In the case of n=60, the $C_1$ sequence is decoded as indicated by a line 93 (FIG. 11B). Further, in the case of n=60, the $C_2$ sequence is decoded as indicated by a line 94 (FIG. 11B). At this time, since a modulo 98 is taken, the symbol $W_{729},B$ to be delayed by 38 frames from 60 frames returns to the position of $M_{(11,0)}$. The same applies to the subsequent symbols.

f. Encoding/decoding process in one embodiment

The above-mentioned encoding process and decoding process are achieved by storing data into a RAM and controlling an address.

Figures 13, 14:
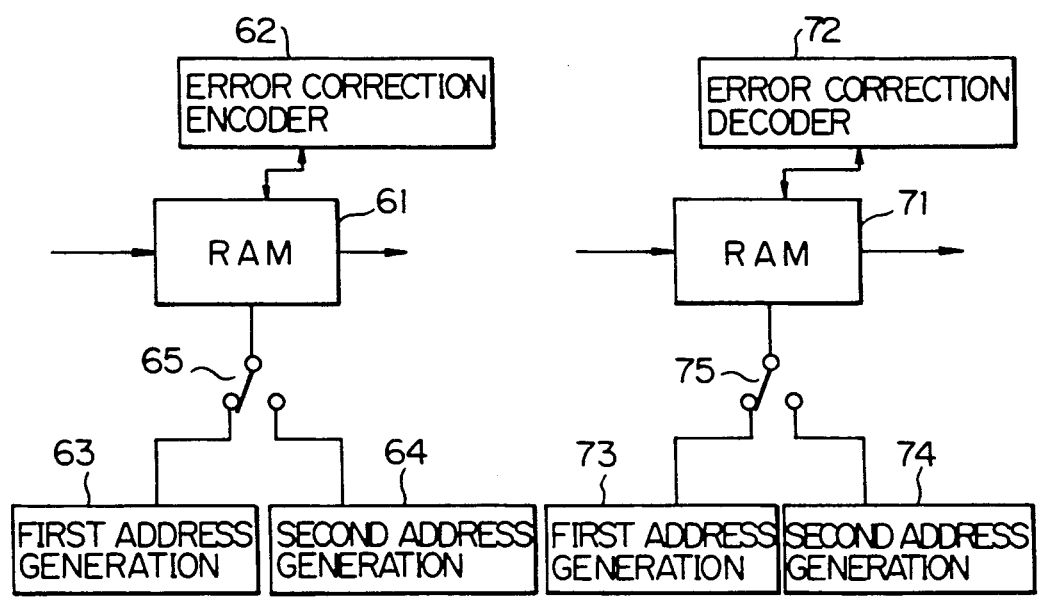
FIG. 13 is a block diagram of one example of an encoding apparatus according to the invention.
FIG. 14 is a block diagram of one example of a decoding apparatus according to the invention.

Specifically, the encoding circuit 3 in FIG. 1 enables the selection of the encoding process in the case of the above-mentioned first and second interleave processes. As shown in FIG. 13, the encoding circuit 3 is composed of a RAM 61, an encoder 62, an address generator 63 for generating an address corresponding to the first interleave process, and an address generator 64 for generating an address corresponding to the second interleave process. By selectively supplying the address corresponding to the first interleave process and produced from the address generator 63 and the address corresponding to the second interleave process and produced from the address generator 64 to the RAM through switch means 65, the selection of either the encoding process of the first interleave process or the second interleave process can be made.

Additionally, the decoding circuit 10 in FIG. 1 enables the selection of the decoding process in the case of the above-mentioned first or second interleave processes. As shown in FIG. 14, the decoding circuit 10 is made up of a RAM 71, an encoder 72, an address generator 73 for generating an address corresponding to the first interleave process and an address generator 74 for generating an address corresponding to the second interleave process. By selectively supplying the address corresponding to the first interleave process and produced from the address generator 73 and the address corresponding to the second interleave process and produced from the address generator 74 to the RAM 71 through switch means 75, the selection of either the decoding process of the first interleave process or the second interleave process can be made.

According to the invention, an interleave process can be selected so that error correction encoding can be completed in one sector consisting of 98 frames. When data is written into an arbitrary sector or data of an arbitrary sector is rewritten, its influence does not extend to other sectors since the error correction encoding can be accomplished in one sector. Further, in the rewriting of the data of the arbitrary sector, no complicated signal processing is needed and no degradation of the data recording capacity takes place.

In addition, since the error correction encoding is finished in one sector, there is no need to take in data of plural sectors at the time of data read-out/write-in, thereby enabling a faster access time.

Having described a specific preferred embodiment of the present invention with reference to the accompanying drawings, it is to be understood that the invention is not limited to that precise embodiment, and that various changes and modifications can be effected therein by one skilled in the art without departing from the scope or the spirit of the invention as defined in the appended claims.

What is claimed is:

1. A digital data recording apparatus of the type having encoding means for adding a predetermined error correction code to input data and means for recording the encoded data onto a recording medium, wherein the improvement resides in the encoding means which comprises a memory for temporarily storing the input data;

control address means for selectively supplying either a first control address or a second control address to the memory; and interleave means for interleaving the input data in response to the control address supplied to the memory, wherein when the control address is the first control address the interleave means interleaves input data to make convolution encoding and when the control address is the second control address the interleave means interleaves input data in a format allowing complete encoding in a sector.

2. A digital data recording apparatus as claimed in claim 1, wherein the means for recording selectively records the first or second control address onto the recording medium.

3. A digital data recording apparatus of the type having encoding means for adding a predetermined error correction code to input data and means for recording the encoded data onto a recording medium, wherein the improvement resides in the encoding means which comprises:

interleave means for interleaving the input data in response to a control address supplied to the interleave means;

means for selectively supplying either a first control address or a second control address to the interleave means; and wherein the first control address causes the interleave means to interleave input data to make convolution encoding and the second control address causes the interleave means to interleave input data in a format allowing complete encoding in a sector.

4. A digital data recording apparatus as claimed in claim 3, wherein the second control address causes the interleave means to interleave input data in a format allowing complete encoding in a sector composed of 98 frames.

5. A digital data recording apparatus as claimed in claim 3, wherein the first control address causes the interleave means to make the entire interleave length equal to a maximum of 108 frames and thereafter does convolutional encoding together with data of the continuous frames.

6. A digital data recording apparatus as claimed in claim 3, wherein the second control address causes the interleave means to make the interleave length a maximum of 95 frames and the interleave is applied by the processing of a modulo 98 while circulating in 98 frames so that error correction encoding is accomplished in a sector consisting of 98 frames.

7. In a digital data reproduction apparatus of the type having means for reproducing and decoding data recorded on a recording medium, wherein the improvement resides in the decoding means which comprises:

a memory for temporarily storing the reproduction data;

control address means for selectively supplying to the memory a first control address or a second control address depending on whether the reproduction data of the recording medium is data recorded by the first control address or data recorded by the second control address;

deinterleave means for deinterleaving the reproduced data and wherein supplying the first control address to the memory causes the deinterleave means to deinterleave input data of which the convolution encoding was done and supplying the second control address to the memory causes the deinterleave means to deinterleave input data of which complete encoding in a sector was done.

8. A digital data reproduction apparatus as claimed in claim 7, wherein a control address is recorded on the medium indicating whether convolution encoding of the data was done or complete encoding of the data in a sector was done and wherein the control address means further comprises means supplied with the reproduced data for detecting whether it is data encoded in accordance with the first control address or the second control address by reproducing the control address recorded on the recording medium.

9. In a digital data reproduction apparatus of the type having means for reproducing and decoding data recorded on a recording medium including a control address recorded on the medium indicating whether convolution encoding of the data was done or complete encoding of the data in a sector was done, wherein the improvement resides in the decoding means which comprises:

deinterleave means, responsive to the reproduced control address, for deinterleaving the reproduced data and wherein the first control address causes the deinterleave means to deinterleave the input data of which the convolution encoding was done and the second control address causes the deinterleave means to deinterleave the input data of which the complete encoding in the sector was done.

* * * * *